(12) United States Patent
Sullivan

(10) Patent No.: US 7,549,380 B2
(45) Date of Patent: *Jun. 23, 2009

(54) HINGE AND SUPPORT SYSTEM FOR AN INTERMEDIATE DECK IN A TRAILER

(75) Inventor: Kevin Sullivan, Cumming, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 482 days.

This patent is subject to a terminal disclaimer.

(21) Appl. No.: 10/978,253

(22) Filed: Oct. 29, 2004

(65) Prior Publication Data
US 2007/0062003 A1 Mar. 22, 2007

Related U.S. Application Data

(63) Continuation of application No. 10/353,266, filed on Jan. 29, 2003, now Pat. No. 6,854,400.

(60) Provisional application No. 60/382,660, filed on May 21, 2002.

(51) Int. Cl.
*B61D 3/06* (2006.01)
*E05D 7/04* (2006.01)

(52) U.S. Cl. ......................... 105/372; 16/249

(58) Field of Classification Search ......... 105/370–372, 105/375; 16/249, 386, 388, 27; 296/184.1, 296/182.1
See application file for complete search history.

(56) References Cited

U.S. PATENT DOCUMENTS

| | | |
|---|---|---|
| 355,277 A | 12/1886 | Newell |
| 2,584,506 A | 2/1952 | Shreve |
| 2,605,912 A | 8/1952 | Small et al. |
| 3,000,666 A | 9/1961 | Fernandes |
| 3,680,491 A | 8/1972 | Chapman et al. |

(Continued)

FOREIGN PATENT DOCUMENTS

EP 0005960 12/1979

(Continued)

OTHER PUBLICATIONS

International Search Report from corresponding Patent Application No. PCT/US03/08333, dated Jul. 25, 2003.

*Primary Examiner*—S. Joseph Morano
*Assistant Examiner*—Robert J McCarry, Jr.
(74) *Attorney, Agent, or Firm*—Alston & Bird LLP

(57) ABSTRACT

A hinge and support system for supporting cargo in a freight compartment is provided. The system includes a hinge member, associated with a deck panel, which has at least one flexible projection. The hinge member mates with a support member having a pocket for which the hinge member's flexible projections can be snapped into and retained within so as to allow pivotal movement of the hinge member with respect to the support member. The hinge member is also movably supported by the deck panel so that the hinge member can move relative to the deck panel when the deck panel is deployed. The support member includes one ledge which engages the deck panel when deployed and a second ledge which engages the panel when stowed upright so as to substantially isolate the hinge member from the weight of the deck panel and items placed on it. The hinge structure can be utilized in other contexts.

18 Claims, 13 Drawing Sheets

U.S. PATENT DOCUMENTS

| | | | |
|---|---|---|---|
| 3,874,009 A | 4/1975 | Nosaka et al. | |
| 3,875,871 A | 4/1975 | Thornton et al. | |
| 3,897,971 A | 8/1975 | Evans | |
| 3,905,309 A | 9/1975 | Suter | |
| 3,911,832 A | 10/1975 | Vandergriff | |
| 4,079,677 A | 3/1978 | Vandergriff et al. | |
| 4,094,546 A | 6/1978 | Glassmeyer et al. | |
| 4,191,109 A | 3/1980 | Wickenberg | |
| 4,281,870 A | 8/1981 | Ehrlich et al. | |
| 4,659,132 A | 4/1987 | Day | |
| 4,850,081 A | 7/1989 | Grant | |
| 4,942,271 A * | 7/1990 | Corsi et al. | 174/101 |
| 4,995,322 A | 2/1991 | Frederick | |
| 5,042,863 A | 8/1991 | Fraga | |
| 5,261,771 A | 11/1993 | Marsch | |
| 5,306,064 A | 4/1994 | Padovano et al. | |
| 5,314,276 A | 5/1994 | Barone | |
| 5,375,534 A | 12/1994 | Adams | |
| 5,452,972 A | 9/1995 | Adams | |
| 5,690,466 A | 11/1997 | Gaddis et al. | |
| 5,809,617 A * | 9/1998 | Harris et al. | 16/273 |
| 5,836,636 A | 11/1998 | Adams | |
| 6,131,320 A * | 10/2000 | Eberle et al. | 40/610 |
| 6,170,897 B1 | 1/2001 | Karrer | |
| 6,854,400 B2 * | 2/2005 | Sullivan | 105/372 |

FOREIGN PATENT DOCUMENTS

| | | |
|---|---|---|
| EP | 0 247 756 A1 | 12/1987 |

\* cited by examiner

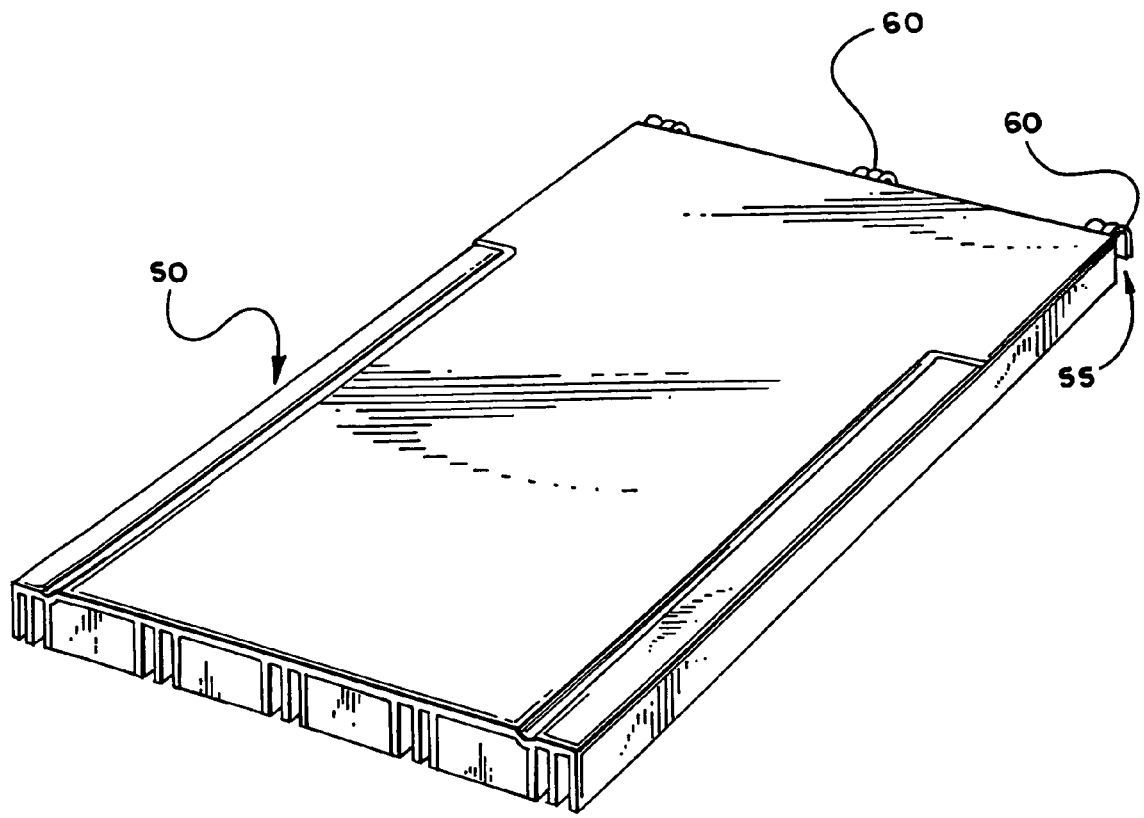
Fig_12

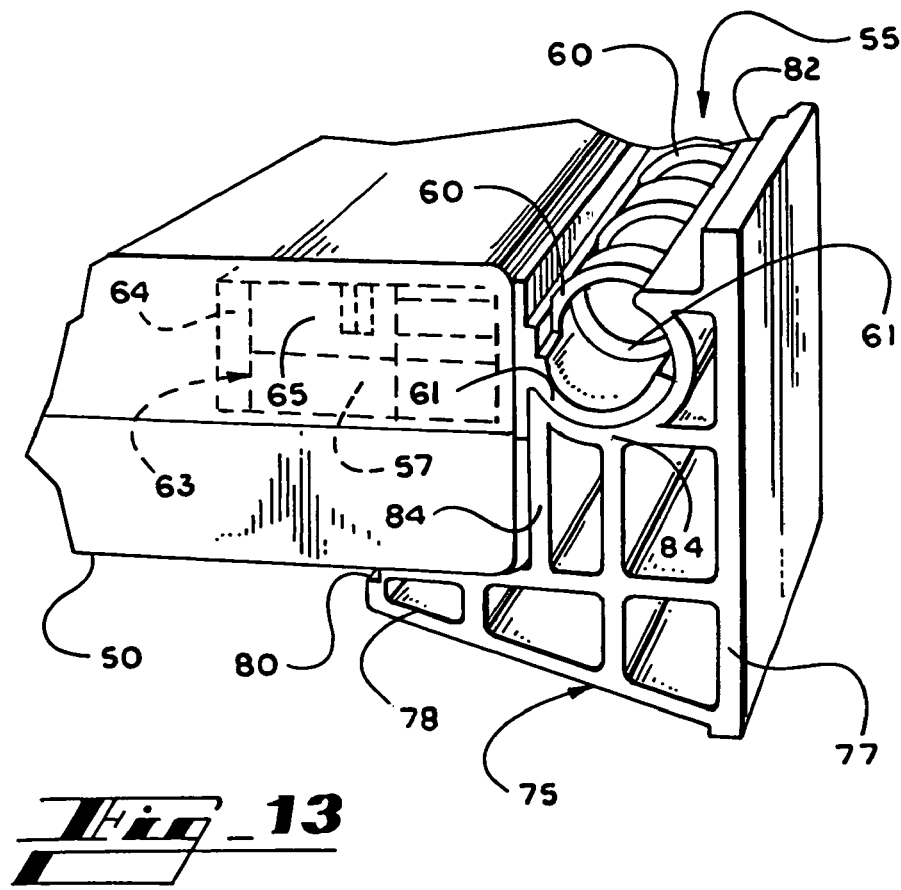
Fig_13
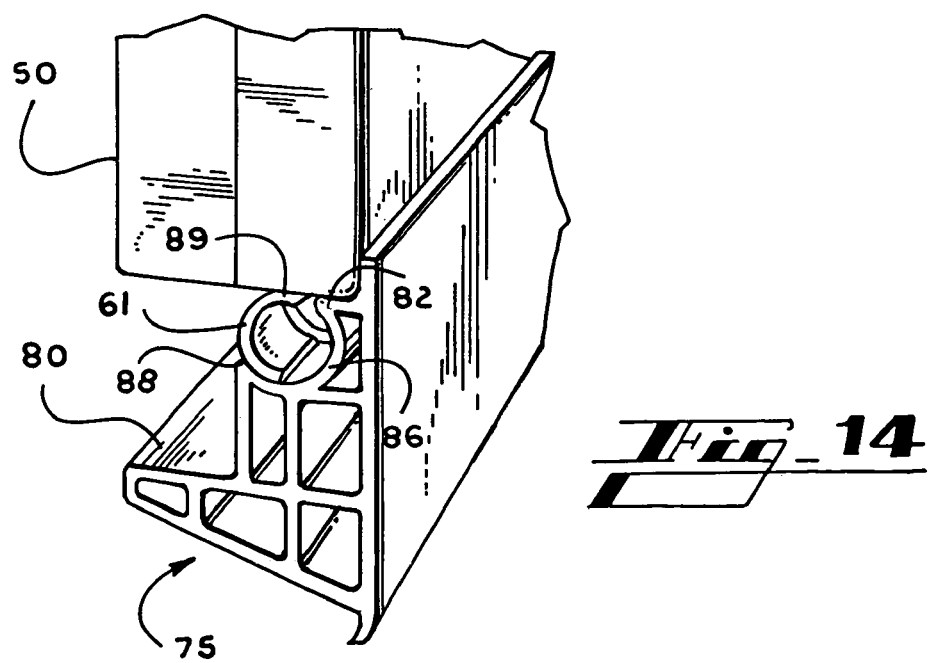
Fig_14

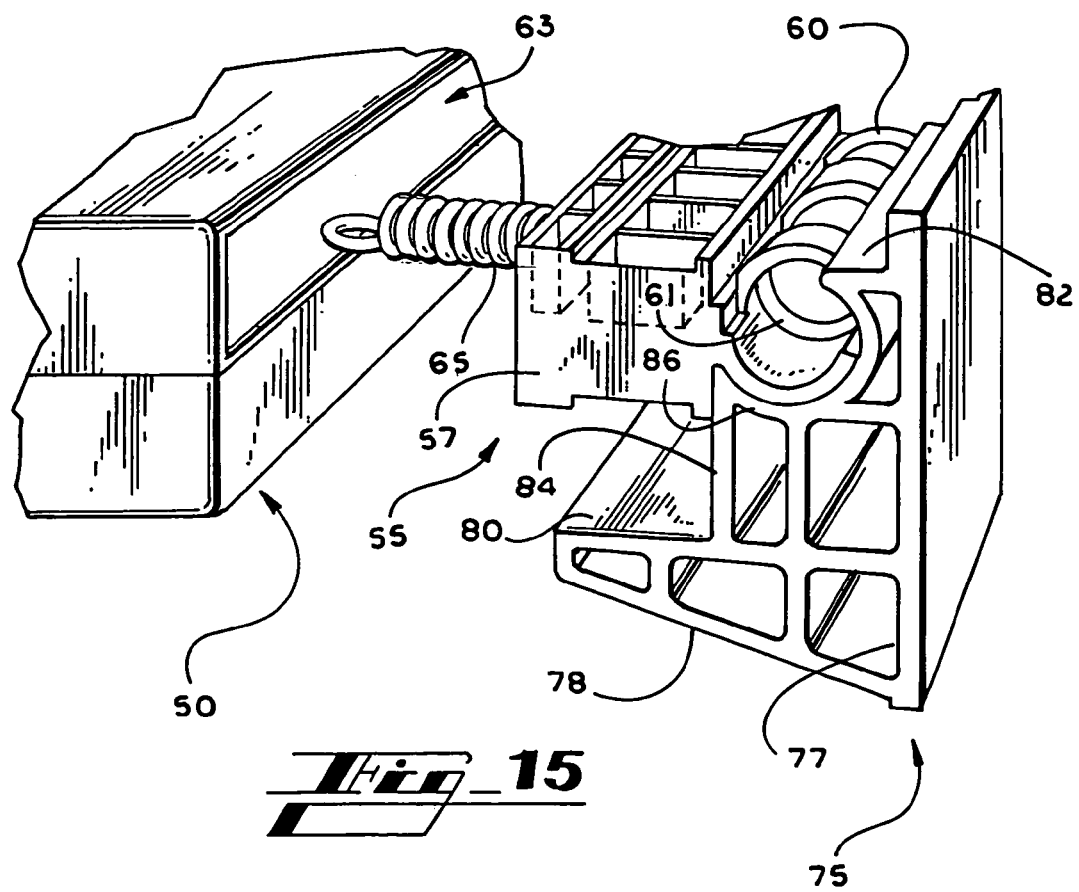
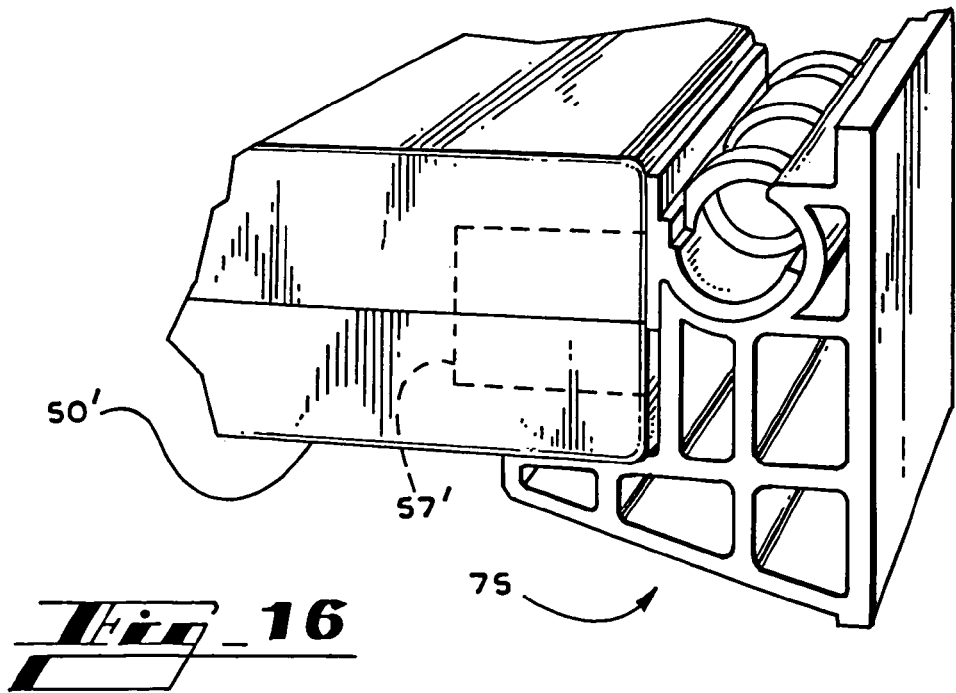

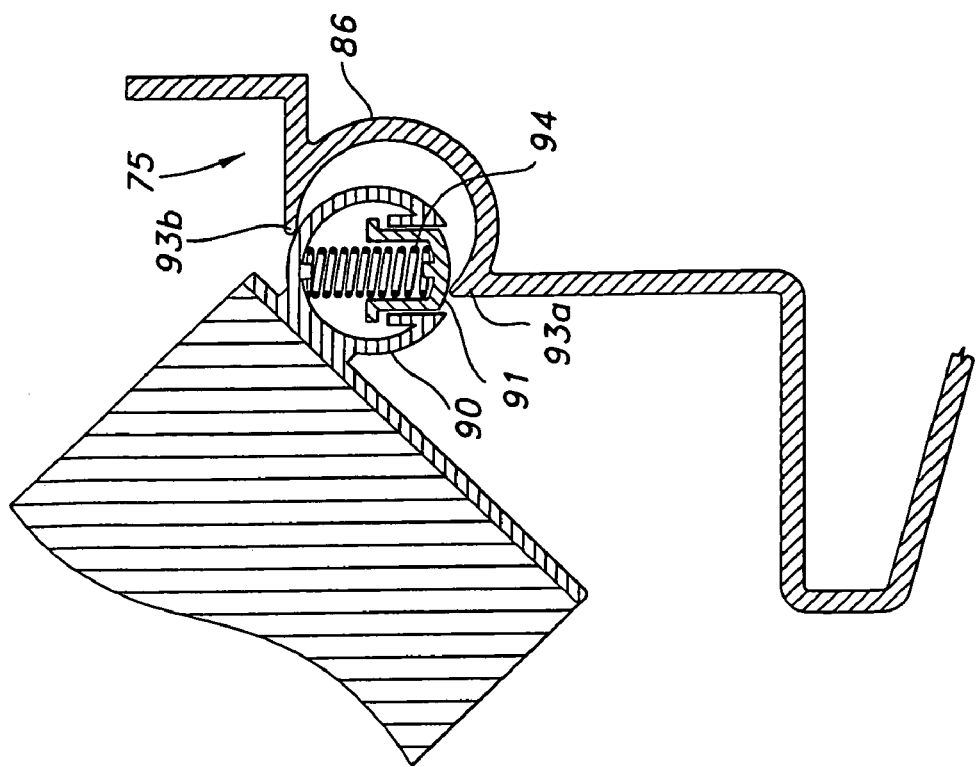
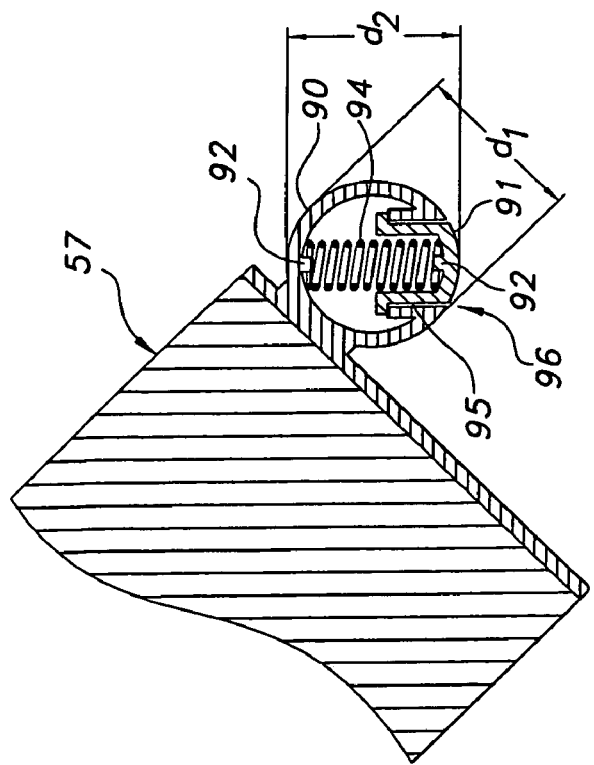
FIG. 20
FIG. 19

HINGE AND SUPPORT SYSTEM FOR AN INTERMEDIATE DECK IN A TRAILER

CROSS-REFERENCE TO RELATED APPLICATIONS

This application is a continuation of U.S. application Ser. No. 10/353,266, filed Jan. 29, 2003, now U.S. Pat. No 6,854,400 which is hereby incorporated herein in its entirety by reference, and claims the benefit of U.S. Provisional Application No. 60/382,660, filed May 21, 2002.

FIELD OF THE INVENTION

The invention relates to intermediate deck structures for use in transport vehicles such as trucks and trailer vans, railway cars, freight containers and the like, and more particularly, to a hinge and support system for an interlocking deck for use in such vehicles suitable for loading and transporting parcels.

BACKGROUND OF THE INVENTION

In a typical truck van, a horizontal bed or floor is provided for supporting articles being transported. Articles are placed on this bed, and depending upon the size of the articles, they may be stacked upon each other at two or more levels.

In some instances, it may be impractical to stack the articles due to the weight or configuration. Where this is the case, a substantial amount of the vehicle interior is rendered unusable. For example, where the articles or containers are fragile, damage to the articles will occur if stacked to the extent that the weight of the upper articles would damage lower articles. In those instances, it is often necessary to avoid stacking or to minimize the amount of stacking.

Some articles are also somewhat difficult to handle due to their weight and configuration. This creates problems for the individuals loading the articles on a bed. Thus, even if articles at a lower level will not be damaged when other articles are stacked thereon, stacking itself may be quite cumbersome and inefficient due to the size and weight of the articles.

Attempts have been made to address some of these problems by incorporating intermediate decks in vehicles. Various types of collapsible or removable intermediate deck structures have been proposed for supporting freight articles of various shapes and weights above the horizontal bed or floor of a transport van, and the like, in order to increase the load carrying ability of a van and to maximize the use of the available cubic capacity of a van. The use of collapsible or removable intermediate decks has not met with wide success, however, due to inefficiencies in the design of the decks which make them too complex, too expensive for practical purposes or simply too inconvenient to use.

The design of existing intermediate deck structures often consist of two deck panels, hinge mounted on opposing walls to enable storage of the deck panels vertically against the side walls. The deck panels rotate downwardly or upwardly on the hinges to a horizontal position to form a continuous section of deck, or secondary floor. Typically, this form requires a means of supporting the deck halves horizontally in a manner which both encroaches on additional usable volume for loading the freight or cargo, and interferes with that space requiring extra effort and time to load around it. Such supports include cantilever support structures, suspension chains or cables or even vertical support legs extending to the primary floor.

For example, U.S. Pat. No. 3,911,832 to Vandergriff discloses an intermediate deck structure for use in railway cars, truck and trailer vans. The deck structure includes a first section pivotally connected at its outer end to the side wall of a vehicle, and adapted to be pivoted between a stored position adjacent the side wall and a horizontal position with its inner end extending inwardly from the side wall. A second section of the Vandergriff intermediate deck has a pair of arms extended from its inner end which are pivotally connected to the first section at a point between the inner and outer ends. The second section of the intermediate deck is adapted to be stored adjacent the side wall of the vehicle below the first section of the intermediate deck in a position extending downwardly from the outer end of the stored first section. The second section is adapted to be pivoted relative to the first section during pivoting of the first section to a horizontal loading position, whereby the second section can also be moved to a horizontal loading position with the outer end of the second section supported by a pair of load brackets engaged with a load rail on the opposite side wall of the vehicle.

A problem encountered with the intermediate deck structure of Vandergriff is that the individual deck structures do not lock together when the two deck sections are stored against the side wall of the vehicle, and the load bracket on the second section extends downwardly to a position where it can interfere with and damage cargo and boxes sitting on the main floor of the vehicle. A further problem with the Vandergriff deck is that the load brackets employed in the intermediate deck structure are subject to jumping out of the wall load track rail slots, causing the load brackets to retract under a load on the deck, and dropping the load onto the cargo positioned underneath the intermediate deck.

U.S. Pat. No. 5,452,972 to Adams discloses a deck structure for use in supporting cargo at an intermediate level above the floor or bed of a trailer van. The Adams intermediate deck includes a first deck section pivotally mounted on a side wall of a trailer van and movable to a horizontal load position, and back up to a vertical stored position against the side wall. Adams employs a complex spring slam bolt and release chain system engaged with a height saving angle locking rail to releaseably hold the deck section. A second section of the deck is pivotally connected to the first section and it is also movable between a horizontal load position and a vertical stored position against the side wall. When the second section is in the vertical stored position it is hanging from the first section and is configured such that it nests in the first deck section to provide a storing intermediate deck structure. When the first and second deck sections are in a horizontal load position, the second section has an outer end which is selectively provided with either the spring biased, telescopically mounted load bracket, or a cap style load bracket, that is operatively seated on a load track rail on the trailer van wall opposite to the wall on which the first deck section is hinged. Although the intermediate deck structure of Adams addresses some of the problems of Vandergriff, in doing so it employs complex chain and spring systems that increase the expense of the intermediate deck structure and enhance the risk of injury to the operator of the system. Also, like Vandergriff, Adams fails to address the problem of the lack of structure to lock individual deck structures together.

U.S. Pat. No. 3,875,871 to Thorton discloses a freight carrier such as a railroad car having sections which, unlike the structures in Vandergriff or Adams, fold from opposite walls toward one another from a stored position to an operational position. In the installed position the sections provide a supplementary cargo level. According to Thorton, in this position the sections have joining means which self-support the load and transmit lading shearing and bending moments between the sections so that additional supports from the floor are not required. The deck sections of the Thorton carrier are provided with flanges or blocks for supporting the sections when they are unfolded and for providing a resting space for subsequently lowered sections. Thorton also describes permanent support areas positioned at one end of the freight car designed to provide a resting area for the first lowered panels. The patent describes these rest areas as a bracket or ledge mounted on the rear wall of the carrier by suitable fasteners or welding.

Other U.S. patents showing related structures include U.S. Pat. Nos. 4,281,870; 3,897,971; and 5,375,534.

Although Thorton seemingly overcomes many of the problems of Vandergriff and the complexities of Adams, it requires welding structures or fasteners to the interior portion of the carrier to do so. Moreover, although Thorton provides flanges or blocks for supporting subsequent sections, the panels described in Thorton are vulnerable to sag under heavier loads due to inadequate support. Moreover, the flanges or blocks of Thorton subject the panels to interference with one another and, like Vandergriff and Adams, do not interlock the panels together in the operational position. Another problem encountered with such systems is stress placed on attachment and hinge systems by flexing of trailer side walls, for example while the vehicle is travelling on the road. Furthermore, in some systems a hinge utilized for deploying and stowing an intermediate deck may have to bear the full weight of the items loaded on the intermediate deck.

Consequently, there is a need for a system for supporting articles more efficiently for transportation purposes. In particular, there is a need for such a support system that is of a highly efficient design whereby the deck can be economically installed in a vehicle, each individual intermediate deck can be adequately supported and locked together with other intermediate decks, the deck system is not adversely affected by flexing of trailer walls, and the system can be efficiently operated by a single user.

SUMMARY OF THE INVENTION

These and other objects and advantages are met by the present invention which includes a deck support system for supporting cargo in a freight compartment having spaced apart side walls.

One aspect of the present invention is a hinge and support system by which a deployable deck panel unit is attached to a side wall of a freight compartment. The freight compartment may be in a vehicle, such as a semi-trailer, a container of the type used in intermodal shipment of goods, or other compartment or enclosure suitable for transporting items. The hinge and support system includes a support member attached to a side wall of the compartment, the support member defining one or more pockets opening generally away from the side wall. A hinge member associated with a deck panel includes one or more projections shaped to be inserted into and retained within a mating pocket of the support member until selectively removed from the mating pocket. In one embodiment, the projections are flexible and are inserted and retained by applying a sufficient force to snap the projections into the pocket. Likewise, the projections can be removed by snapping them out of the pocket. In another embodiment, the hinge member includes rigid projections that may include a locking plunger and the assembly is snapped into and retained within the mating pocket. In still another embodiment, the rigid projections are shaped to allow insertion and removal only in a particular orientation, but without a snapping action or application of force. As will become apparent from the detailed description below, the shape of the pockets and projections may vary widely so long as they function as described above.

Generally described, this aspect of the invention provides a hinge and support system for pivotally mounting a deck panel to a side wall of a freight compartment, comprising: a support member, extending generally horizontally along one of the side walls, defining one or more pockets therein, the one or more pockets each defining an elongate channel positioned along a pivot axis; and a hinge member, associated with a deck panel, defining a flexible projection sized and shaped to be snapped into and retained within the pocket so as to allow pivotal movement of the hinge member with respect to the support member about the pivot axis.

According to another aspect of the invention, a support member for a hinge member defines one or two ledges for a deck panel associated with the hinge member. One type of ledge is positioned to support the weight of the deck panel when stowed against a side wall of a compartment, and the other type of ledge is positioned to support the weight of the deck panel, and items loaded on it, when deployed away from the side wall. The ledges need not be smooth or planar or continuous; they should provide sufficient points of support to receive the deck panel in a stable fashion.

Generally described, according to this aspect the invention provides a freight compartment, comprising a compartment having a floor and at least two spaced apart side walls; at least one support member, extending generally horizontally along one of the side walls; and at least one hinge member, associated with a deck panel, engaging the support member so as to allow pivotal movement of the hinge member, along with the associated deck panel, between a generally upright stowed position and a generally horizontal deployed position, about a pivot axis; wherein the deck panel associated with the hinge member at least partially defines a platform in the compartment spaced above the floor when the deck panel is in the deployed position; and wherein the support member defines a first ledge, wherein the first ledge is positioned to engage the deck panel in a deployed configuration so as to substantially isolate the hinge member from weight of the deck panel and items on it. The support member optionally and preferably defines a second ledge, wherein the second ledge is positioned to bear weight of the deck panel when stowed generally upright against the side wall so as to substantially isolate the hinge member from the weight of the deck panel.

According to another aspect of the invention, a hinge member is movably supported by a deck panel so that the hinge member can move relative to the deck panel when the deck panel is deployed, such movement having a component of motion perpendicular to the side wall of the compartment. When the side wall flexes, such as during transport, the hinge member moves relative to the deck panel, in most cases preventing the force of the flexing side wall from snapping a hinge member out of the pocket in which it is engaged.

Generally described, according to this aspect the invention provides a freight compartment, comprising a compartment having a floor and at least two spaced apart side walls at least one support member, extending generally horizontally along one of the side walls; and at least one hinge member, associated with a deck panel, engaging the support member so as to allow pivotal movement of the hinge member, and the associated deck panel, between a generally upright stowed position and a generally horizontal deployed position; wherein the deck panel associated with the hinge member at least partially defines a platform in the compartment spaced above the floor when the deck panel is in the deployed position; and wherein the hinge member is movably supported by the deck panel so that the hinge member can move relative to the deck panel when the deck panel is deployed, such movement having a component of motion perpendicular to the side wall. In one embodiment, the hinge member includes at least one block sized to be received in a cavity formed in an end of the deck panel. The block can move within the cavity, and is urged into the cavity. Optionally, a plurality of separate blocks and cavities may be provided for a deck panel.

One of various intermediate deck support systems with which the hinge and support system may be utilized includes at least one pair of deck panels mounted opposite one another on the side walls, the deck panels being capable of movement between an upright or stowed position and a deployed position. Each of the respective deck panels have an end pivotally mounted to the side wall and a free end. When the deck panels are in the deployed position they at least partially define a secondary platform of the vehicle freight compartment when the free ends are adjacent to one another in the deployed position. The deck support system also includes one or more anchors mounted to each of the side walls of the freight compartment to secure the deck panels to the side walls in the upright position.

In this embodiment, the system includes a support bracket that removably engages the deck panels adjacent the free ends when the deck panels are in the deployed position. In one embodiment, the support bracket removably engages the deck panels along a side edge of each panel. The support bracket interlocks the pair of deployed deck panels and provides a support ledge for other deck panels. The bracket has an elongated body, which preferably has a rectangular cross section and defines a longitudinal axis. The elongated body has a first side and a second side with a longitudinally extending channel defined in the first side, which is shaped for removable engagement with the pair of deck panels. The elongated body also has a longitudinally extending support ledge defined in its second side. The longitudinally extending channel of the bracket interlocks the deployed deck panels and the longitudinally extending support ledge is capable of providing support to further pairs of deployed deck panels.

In one embodiment, the longitudinally extending channel slidably engages the deployed deck panels and is capable of linear movement perpendicular to the mating faces of the deployed deck panels. This arrangement may further include a stop bracket affixed to one panel limiting the sliding movement of the channel to facilitate optimal positioning of the channel relative to the panels. In another embodiment, the first side of the elongated body of the bracket is pivotally secured to one of the deck panels of the pair and the longitudinally extending channel pivotably engages the deployed deck panels.

In a preferred embodiment, the deck support system also includes a horizontal starter panel secured at the front of the freight compartment between the side walls and adjacent at least one pair of the deployed deck panels. In this embodiment, a support bracket is secured to the starter panel to support a pair of deployed deck panels adjacent the starter panel.

Advantageously, the deck support system of the present invention supports articles more efficiently than prior art systems for transportation purposes. In particular, the deck support system is lightweight and is of highly efficient design whereby the deck can be economically installed in a vehicle, each individual intermediate deck is adequately supported and can be locked together with other decks, and the system can be efficiently operated by a single user.

Furthermore, the hinge aspect of the present invention can be applied in many contexts other than those described herein. This aspect of the invention provides a hinge structure, comprising a first member defining one or more pockets therein, the one or more pockets each defining an elongate channel positioned along a pivot axis; and a second member defining at least one flexible projection sized and shaped to be snapped into and retained within one of the pockets so as to allow pivotal movement of the first member with respect to the second member about the pivot axis. In alternative embodiments, the flexible projection is of a flexibility selected so that one person can force the flexible projection to be snapped into and pulled out of the pocket. Similarly, each elongate channel may include a part-circular cross section that extends beyond 180 degrees so as to allow the pocket to trap the flexible projection when the flexible projection is forced to flex and snap into the pocket, and the flexible projection may comprise an arcuate finger that lies along a portion of a circle.

In one embodiment of the hinge structure, the second member may comprise a plurality of the flexible projections connected to a base, and the flexible projections may comprise arcuate fingers that lie along a portion of a circle and are attached at one end to the base. In this case the arcuate fingers may include at least one arcuate finger having a direction of curvature opposite from a direction of curvature of at least one other arcuate finger. The one or more channels may each define an elongate opening through which the fingers extend, the opening being sufficiently wide to allow the second member to rotate from a generally horizontal position to a generally upright position.

In another embodiment of the hinge structure, the second member comprises a rigid projection further comprising a first piece largely circular in cross section mating with a second piece comprising a locking plunger, such that when the two pieces are fully mated, the assembly provides a near complete circular cross section. The locking plunger is held in a mated position by a locking screw or spring. When the locking plunger is partially mated, the effective diameter at a specific orientation is less than the inside diameter of the pocket and the assembly can be inserted into the retaining pocket when positioned at a specific angle relative to the pocket. After insertion, the locking plunger returns to a fully mated position automatically by spring action or by adjusting the locking screw. After the locking plunger is fully mated, the effective diameter at the specific orientation increases and the hinge assembly can then pivot freely. The hinge assembly cannot be removed from the pocket except when positioned at the specific angular position and the locking plunger is partially mated.

In an alternative embodiment, the locking plunger is omitted and the hinge structure comprises a rigid projection that is largely circular in cross section. The hinge structure can be inserted and removed from the pocket only at a specific angular position, but without application of any force or adjustment of locking screws.

BRIEF DESCRIPTION OF THE DRAWINGS

Some of the advantages of the present invention have been stated, others will appear as the description proceeds, when considered in conjunction with the accompanying drawings, which are not necessarily drawn to scale, in which:

FIG. 12 is a pictorial view of a molded plastic deck panel unit.

FIG. 13 is an end pictorial view of a hinge and support system embodying the invention with the associated deck panel in the deployed position.

FIG. 14 is an end pictorial view of a hinge and support system embodying the invention with the associated deck panel in the stowed position.

FIG. 15 is an exploded end pictorial view of a hinge and support system embodying the invention.

FIG. 16 is an end pictorial view of a hinge and support system embodying the invention showing the block of the hinge member positioned symmetrically within the deck panel.

FIG. 19 is a cross sectional view of the hinge embodiment of the invention employing a two piece assembly shown in a fully mated position.

FIG. 20 is a cross sectional view of the hinge and support system embodying the invention showing the two piece hinge assembly in a partially mated position during insertion in the support system.

DETAILED DESCRIPTION OF THE INVENTION

The present invention will now be described more fully hereinafter with reference to the accompanying drawings, in which embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
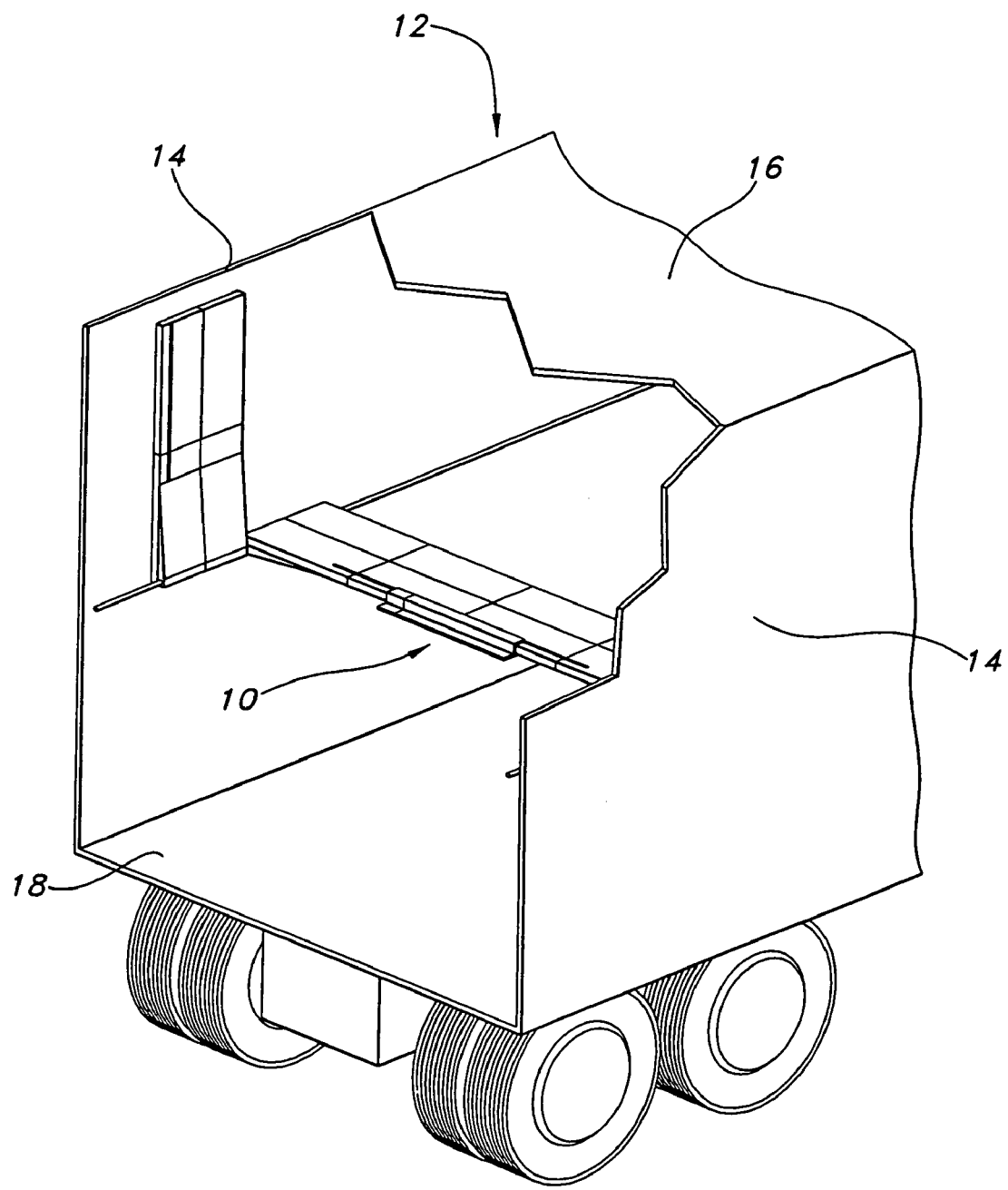
FIG. 1 is a perspective view, partially cutaway, of the rearward portion of a truck trailer including an embodiment of the deck support system in accordance with the present invention.

Referring to the accompanying drawings, FIGS. 1-11 illustrate a deck support system, indicated generally at 10 in FIG. 1, installed on a truck trailer 12. The truck trailer 12 is enclosed by side walls 14, a roof 16 and a floor 18. While the illustrated embodiment and the following description describe the deck support system of the present invention in conjunction with a truck trailer, the deck support system need not be used in conjunction with a truck trailer, but can instead be used in conjunction with various types of freight compartments including transport vehicles or devices such as railway cars, airplanes or transport containers.

Figure 2:
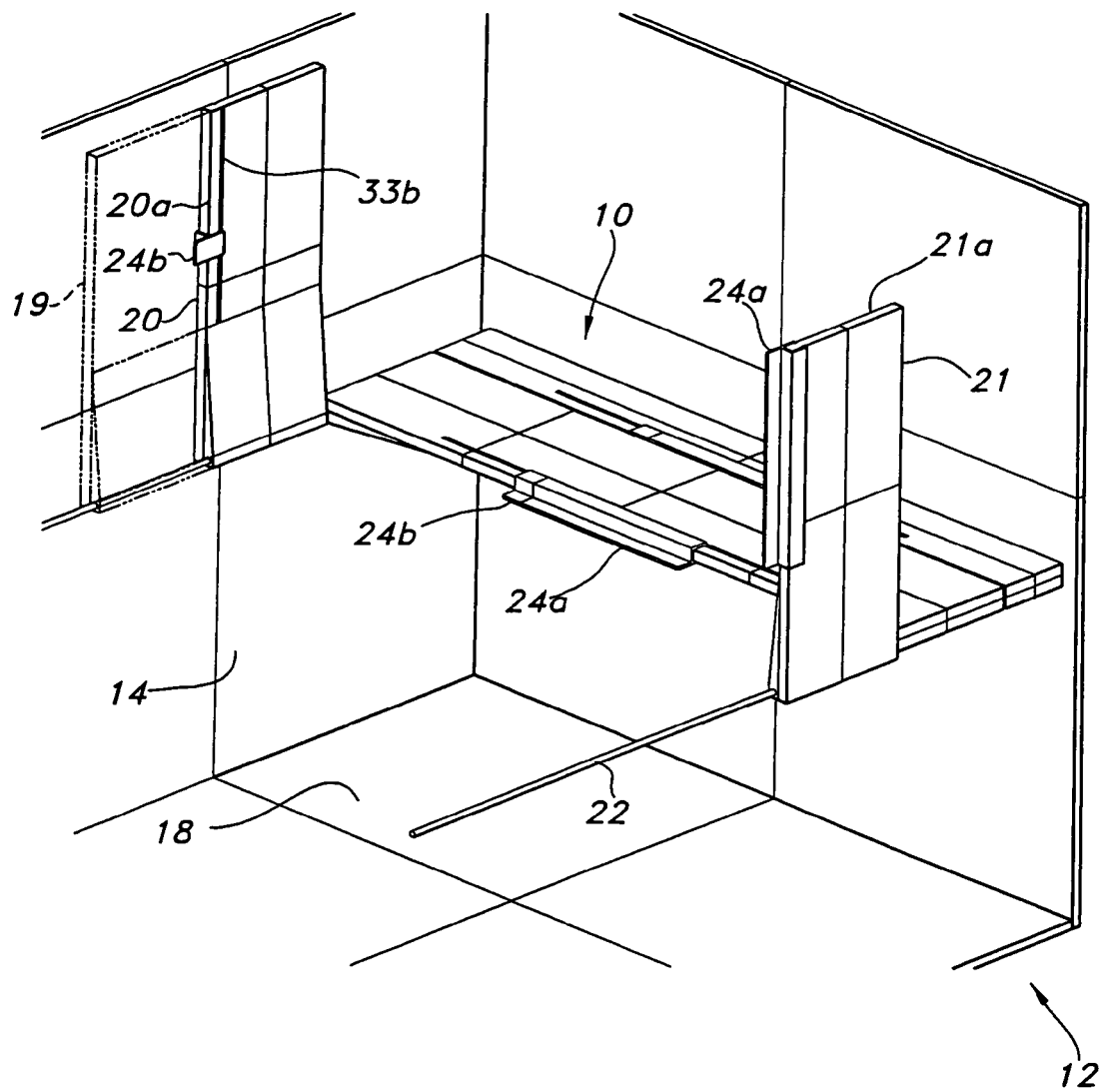
FIG. 2 is a perspective view of the interior forward portion of the truck trailer shown in FIG. 1 including an embodiment of the deck support system.
Figure 8:
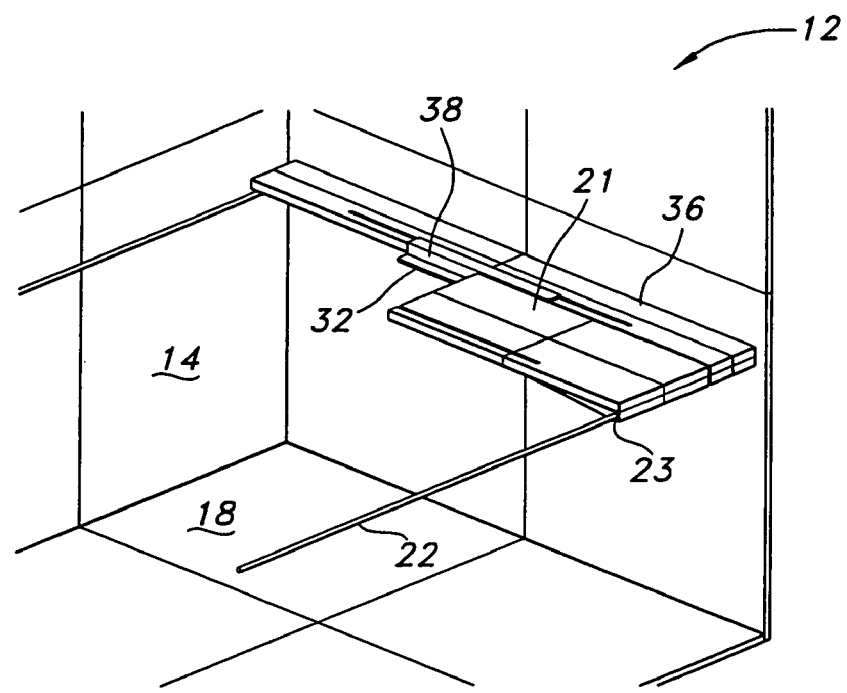
FIG. 8 is a perspective view of the interior forward portion of the truck trailer demonstrating placement of a deck panel of the deck support system.
Figure 9:
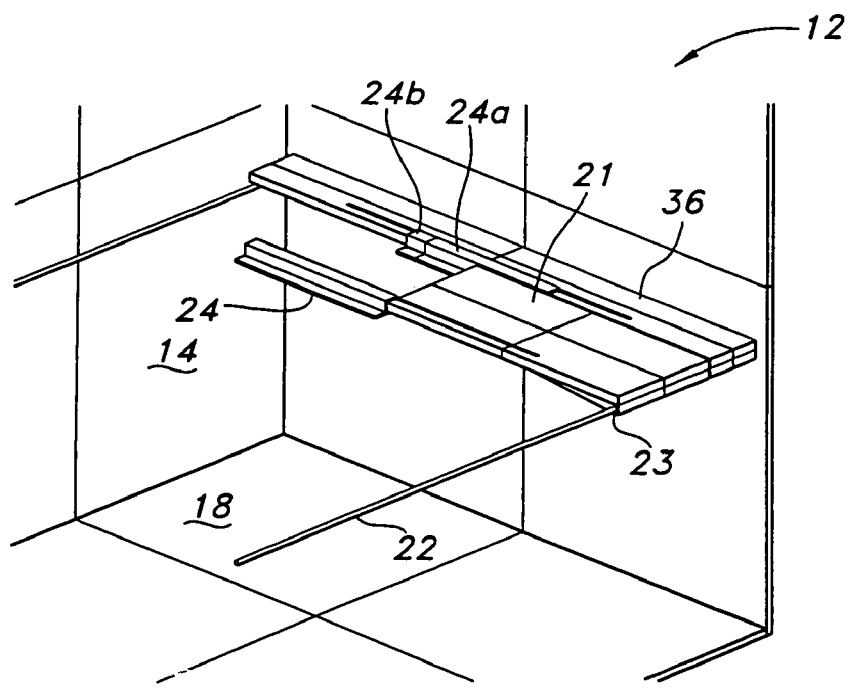
FIG. 9 is a perspective view of the interior forward portion of the truck trailer demonstrating placement of a support bracket over the deck panel shown in FIG. 8.

As best shown in FIG. 2, the deck support system 10 generally includes at least one pair of deck panels 20 and 21 mounted opposite one another on the side walls 14 of truck trailer 12. The pair of deck panels 20 and 21 are mounted on the side walls 14 by one or more anchors mounted to each of the side walls. In one embodiment, these anchors are horizontal rails 22 that generally run the length of truck trailer 12. The deck panels 20 and 21 are maintained in their upright position by locks (not shown) provided on the walls 14 of the truck trailer 12. As shown in FIGS. 8 and 9, the deck panels 20 and 21 are fitted with notched mounting brackets 23 that are designed to hook over horizontal rails 22. In this way, the deck panels 20 and 21 may rotate about horizontal rails 22 between a stored upright position and an extended horizontal deployed position, both as shown in FIG. 2. The deck panels 20 and 21 have free ends 20a and 21a, respectively. When the deck panels 20 and 21 are deployed and their respective free ends 20a and 21a are adjacent, the deck panels 20 and 21 at least partially define a platform in truck trailer 12 above the floor 18.

Figure 3:
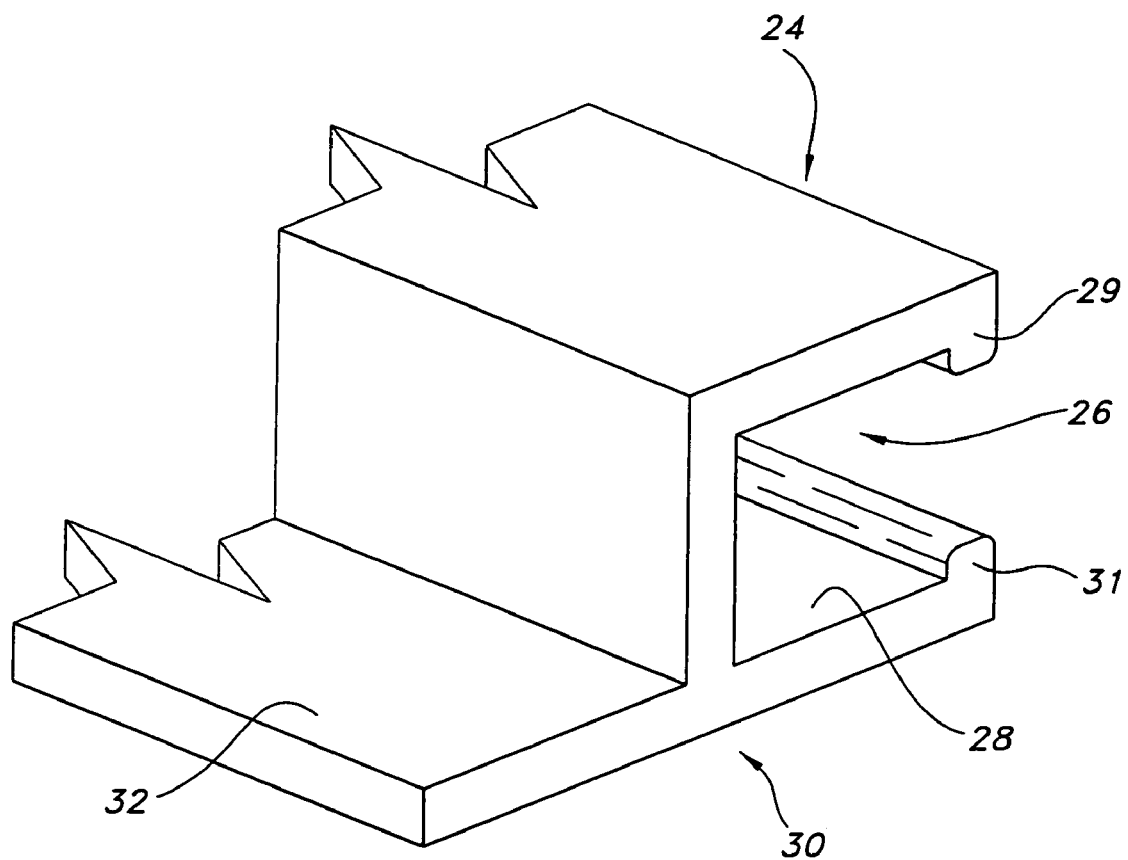
FIG. 3 is a perspective view of a support bracket of the deck support system.

The deck support system 10 also includes a support bracket 24a, which is preferably removably mounted between each pair of extended deck panels 20 and 21 to both interlock the pairs of deck panels 20 and 21 together and provide support to the pairs of deck panels 20 and 21. As shown in FIG. 3, the interlocking support bracket 24 has an elongated body and preferably is of a rectangular cross section. The support bracket 24 includes a first side 26 defining a longitudinally extended channel 28. The support bracket 24 also includes a second side 30 defining a longitudinally extending support ledge 32.

Figure 4:
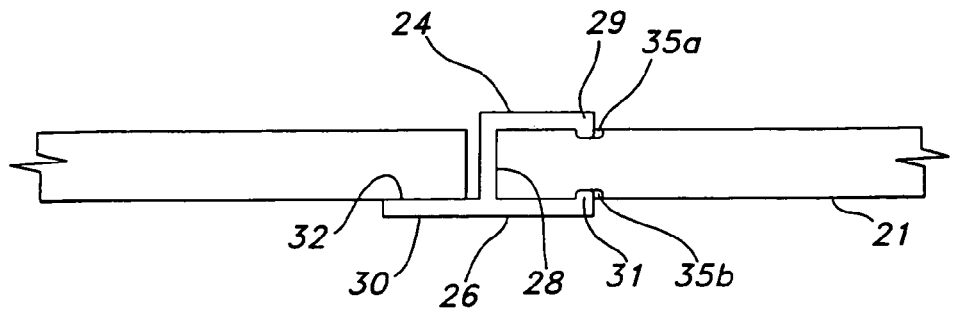
FIG. 4 is a side view of a support bracket slidably secured to a deck panel.
Figure 5:
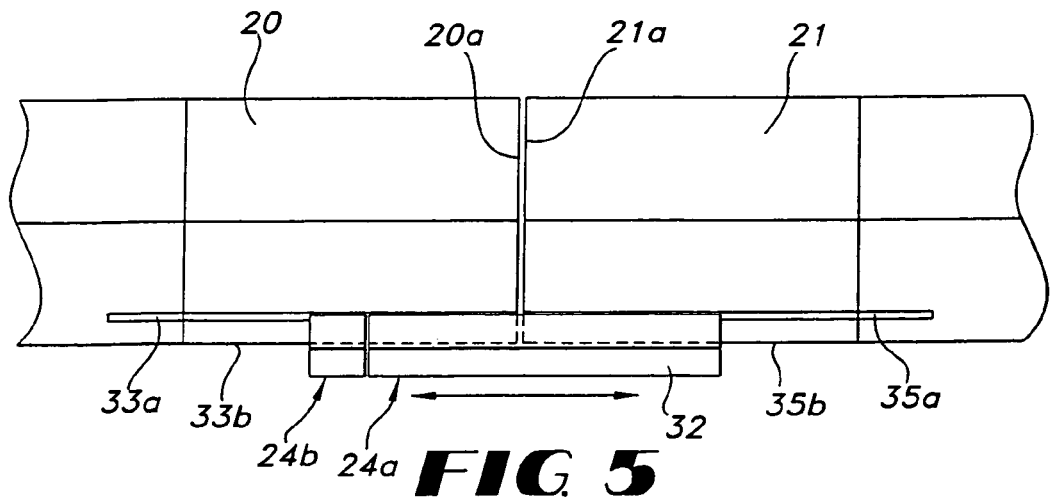
FIG. 5 is a plan view of the secured support bracket of FIG. 4.
Figure 11:
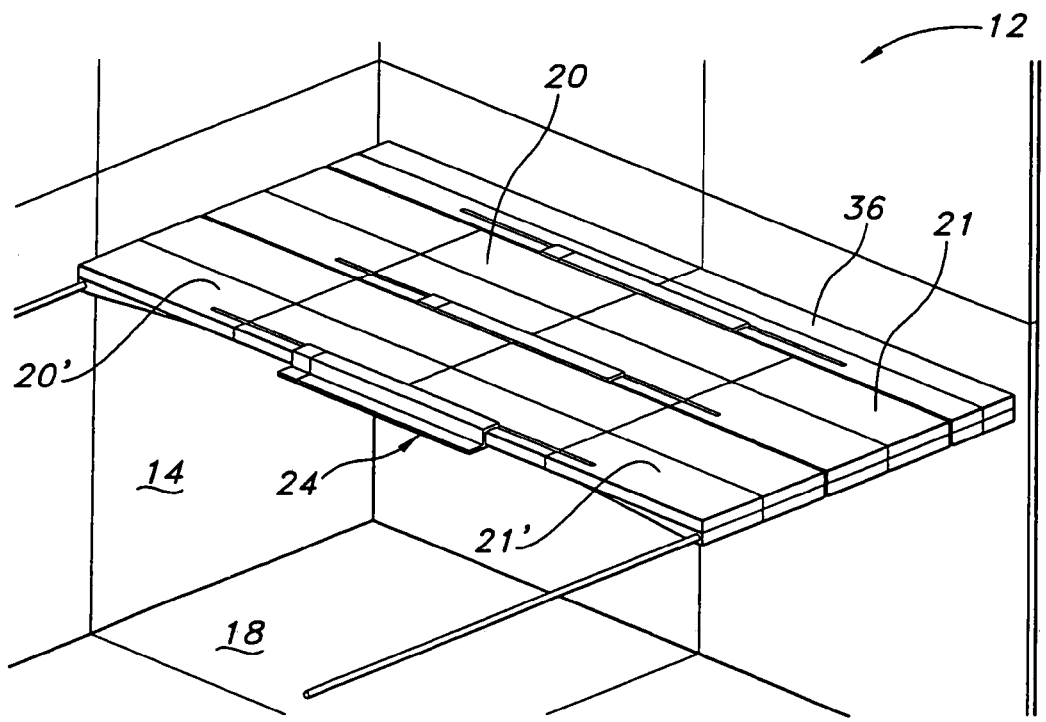
FIG. 11 is a perspective view of the interior forward portion of the truck trailer demonstrating the deck support system of the present invention.

In the embodiment shown in FIG. 3, the longitudinally extending channel 28 has an upper lip 29 and a lower lip 31. The lips 29 and 31 preferably extend the length of channel 28. As shown in FIGS. 4 and 5, the longitudinally extending channel 28 of support bracket 24 preferably engages the edge of deck panels 20 and 21 by virtue of the upper lip 29 and the lower lip 31. The upper lip 29 and the lower lip 31 engage a series of grooves in deck panels 20 and 21. In particular, the deck panel 20 includes an upper groove 33a and a lower groove 33b, and the deck panel 21 includes an upper groove 35a and a lower groove 35b. In order to removably and slidably engage the deck panels 20 and 21, the upper lip 29 of support bracket 24a engages upper groove 33a of panel 20 and upper groove 35a of panel 21. Similarly, the lower lip 31 of support bracket 24a engages lower groove 33b of panel 20 and lower groove 35b of panel 21. As shown in FIG. 5, a stop in the form of a stop bracket 24b is affixed to the panel 20 and stops the sliding action of the support bracket 24a in an optimal position. The stop bracket 24b preferably is formed with the same cross section as that of the support bracket 24a. However, other embodiments of the stop include a nib or protrusion formed on the panel, a screw head protruding from the surface of the panel, or similar means for limiting the linear travel of the support bracket 24a. By engaging the deck panels 20 and 21 in this way, the support bracket 24a is capable of linear travel across the faces of deck panels 20 and 21 when the deck panels are deployed. At the same time, the longitudinally extending channel 28 of the support bracket 24a interlocks the deployed deck panels 20 and 21 and the longitudinally extending support ledge 32 provides support to further pairs of adjacent deployed deck panels 20' and 21' as shown in FIG. 11. The grooves 35a, 35b are at least as long as the support bracket 24, so that the bracket 24 can be stored with the deck panel 21 without protruding past its free end 21a.

Figure 7:
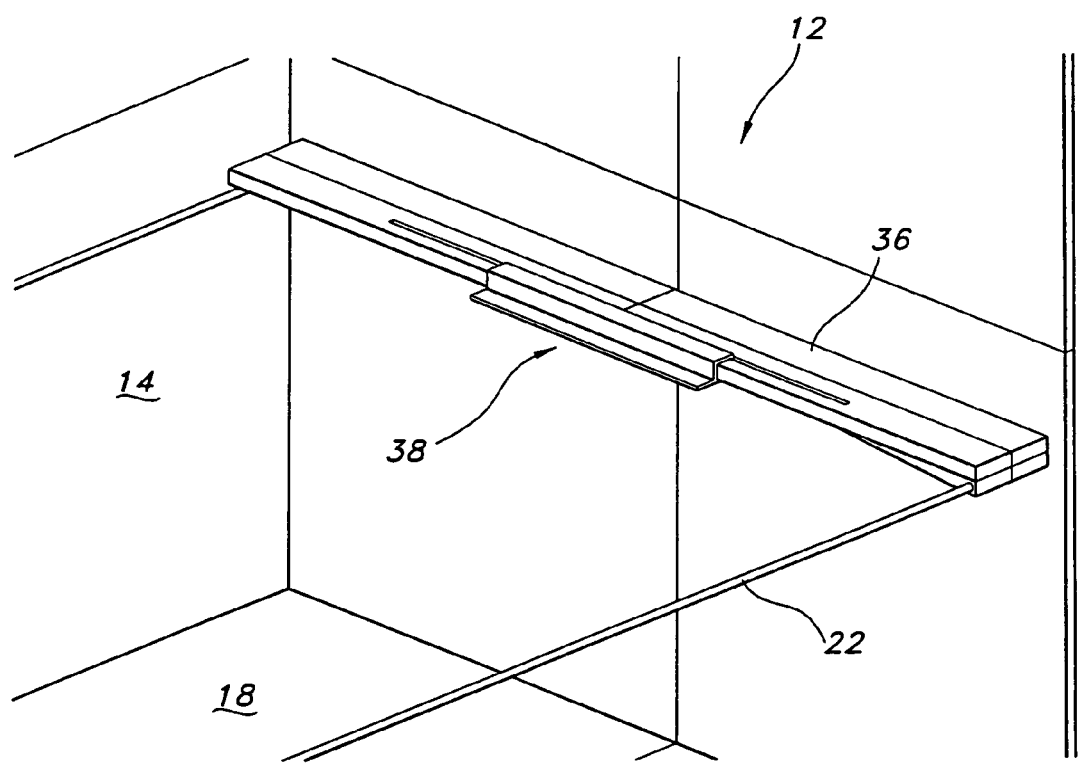
FIG. 7 is a perspective view of the interior forward portion of the truck trailer demonstrating a horizontal starter panel and a support bracket of the deck support system.

Referring to FIGS. 7 through 11, a secondary platform in truck trailer 12 may be constructed using the above described embodiment of the deck support system 10 by first securing a starter panel 36 to the horizontal rails 22 between the vertical walls 14 and against the forward part of truck trailer 12 as shown in FIG. 7. Although in this embodiment the starter panel 36 is secured against the forward part of the truck trailer 12, one of ordinary skill in the art will understand that starter panel 36 may be installed at any location in the trailer 12 where the user desires to start building a secondary platform within the truck trailer 12. Preferably, starter panel 36 is a continuous shelf that extends between the vertical walls 14.

A bracket 38 may next be secured to starter panel 36 so that support ledge 32 provides a way to support subsequent deployed deck panels 20 and 21. The first bracket 38 is preferably rigidly secured to starter panel 36, but alternatively may be slidably secured thereon such as by a lip and groove design and positioned using a stop bracket. As shown in FIG. 8, after the bracket 38 is in place, the deck panel 21 is rotated from its upright position against wall 14 to its deployed position, resting on the bracket 38. In the alternative, a simple flange may be attached to the forward trailer wall to support the first pair of deck panels to provide the same function as support ledge 32.

Figure 10:
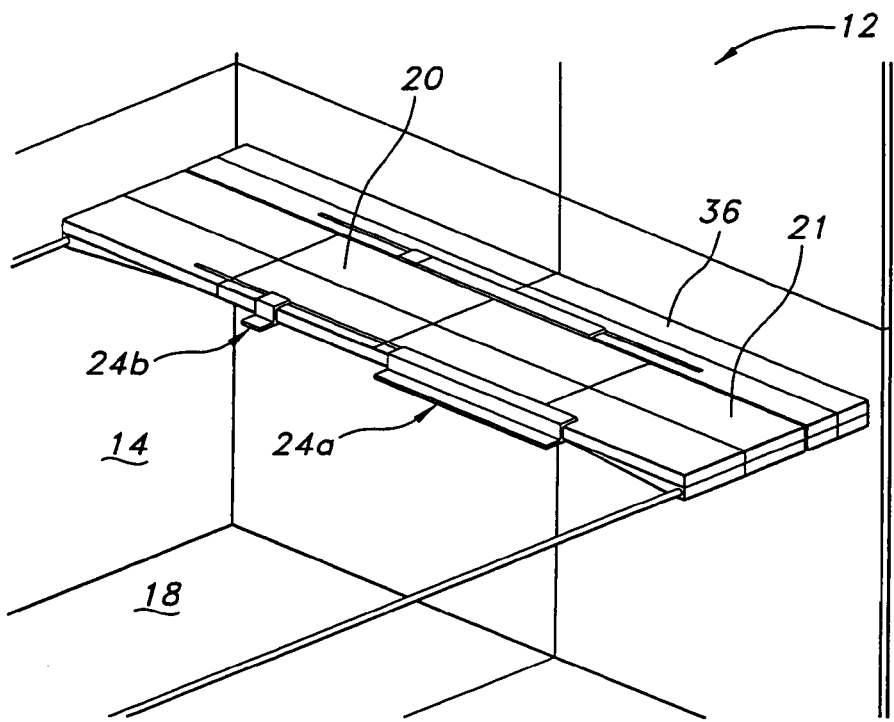
FIG. 10 is a perspective view of the interior forward portion of the truck trailer demonstrating placement of a deck panel of the deck support system.

Next, as shown in FIG. 9, a support bracket 24 is slid over the deck panel 21 to prepare for the horizontal deployment of the deck panel 20 on the opposite side wall of truck trailer 12. The support bracket 24 may either stored somewhere on the trailer and be slid over the deck panel 21 (as described) or may be included on the deck panel 21 while the deck panel 21 is in its upright position. It will be seen that in the upright position of the panel 21, each bracket 24 assists in holding the next adjacent panel (towards the rear of the trailer) against the trailer sidewall. This is also true of the preferred stop bracket with respect to holding adjacent deck panels against the opposite side wall. As shown in FIG. 10, the support bracket 24a is slid onto the deck panel 21 out of the way of the deck panel 20, and then the deck panel 20 is deployed to its horizontal position. The support bracket 24a is then slid back until it engages both deck panel 20 and deck panel 21. The stop bracket 24b ensures that the support bracket 24a is slid back to the proper position with roughly half the length of the support bracket on one panel 21' and the other half on the other panel 20'. The support bracket 24a engages the deck panels 20 and 21 by virtue of the engagement of upper lip 29 and lower lip 31 on the support bracket 24a with the upper groove 33a and lower groove 33b of deck panel 20, and the upper groove 35a and lower groove 35b of deck panel 21.

As shown in FIG. 5, preferably the upper grooves 35a, 35b of deck panel 21 are longer than upper grooves 33a, 33b of deck panel 20. Because of this, the support bracket 24a can travel further onto deck panel 21 and completely out of the way of the deck panel 20. On the other hand, when the support bracket 24a engages the deck panel 20, preferably it may only travel far enough to provide complete engagement between the deck panel 20 and the deck panel 21. Proper positioning of the support bracket is facilitated by the stop bracket 24b.

Thus, after the deck panel 20 is deployed, the support bracket 24a is slid back onto the deck panel 20 so that it slidably engages both deck panels 20 and 21 and locks them together. This process is repeated, as demonstrated in FIG. 11, until the desired number of deck panels are extended from their vertical position so that a sufficient amount of secondary platform space is created in truck trailer 12 for the storage of articles.

Figure 6:
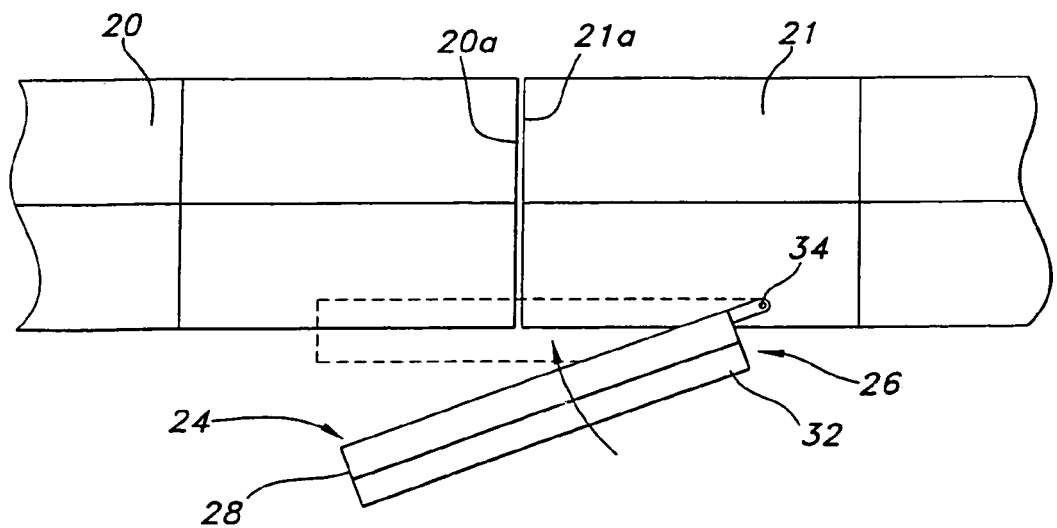
FIG. 6 is a plan view of a support bracket pivotably secured to a deck panel.

In another embodiment of the deck support system, shown in FIG. 6, the support bracket 24 does not include an upper lip 29 and lower lip 31 and the deck panels 20 and 21 do not include a series of grooves. Instead, the support bracket 24 includes only a longitudinally extending channel 28 and a longitudinally extending support ledge 32. In this embodiment, support bracket 24 is rotatably secured to one of the two deck panels 20 and 21 of the pair. This may be done, for example, by a pivot pin 34 secured through the first side 26 of support bracket 24. The support bracket 24 can be rotated into position to interlock the deck panels 20 and 21 when the deck panels 20 and 21 are deployed to the horizontal position, thereby providing the interlocking and support for the deck panels 20 and 21. Because the support bracket 24 is rotated into position, the stop bracket is not required in this embodiment to limit sliding movement of the support bracket. Nevertheless, a stop bracket may be used to facilitate support of the next adjacent panels 19 in an upright position described above and as shown in FIG. 2.

In this embodiment, a secondary platform in truck trailer 12 may be constructed using the deck support system 10 by first securing a starter panel 36 to the horizontal rails 22 between the vertical walls 14 and against the forward part of truck trailer 12 as shown in FIG. 7. Again, preferably, starter panel 36 is a continuous shelf that extends between the walls 14. A bracket 38 may next be secured to starter panel 36 so that support ledge 32 provides a way to support subsequent deployed deck panels 20 and 21. After the bracket 38 is in place, the deck panel 21 is rotated from its upright position against wall 14, with the support bracket 24 pivotably secured to the panel 21, to its deployed position, resting on the bracket 38.

The support bracket 24 is rotated out of the way of the path of rotation of the deck panel 20 to prepare for the horizontal deployment of the deck panel 20. The deck panel 20 is then deployed to its horizontal position and the support bracket 24 is rotated into position, as demonstrated in FIG. 6, so that it engages both the deck panel 20 and the deck panel 21 and provides a support ledge for subsequently deployed deck panels. Again, this process is repeated until the desired number of deck panels are extended from their vertical position so that a sufficient amount of secondary floor space is created in truck trailer 12 for the storage of articles.

FIGS. 12 through 15 show an alternative system for pivotally mounting deck panels to the side walls 14 of the freight compartment. An alternative deck panel 50, which can be made of 30% glass filled nylon, or any other suitable plastic, metal, or composite material, is shown in FIG. 12. A lightweight molded synthetic deck panel in which the ends are capped may be preferred.

Figure 18:
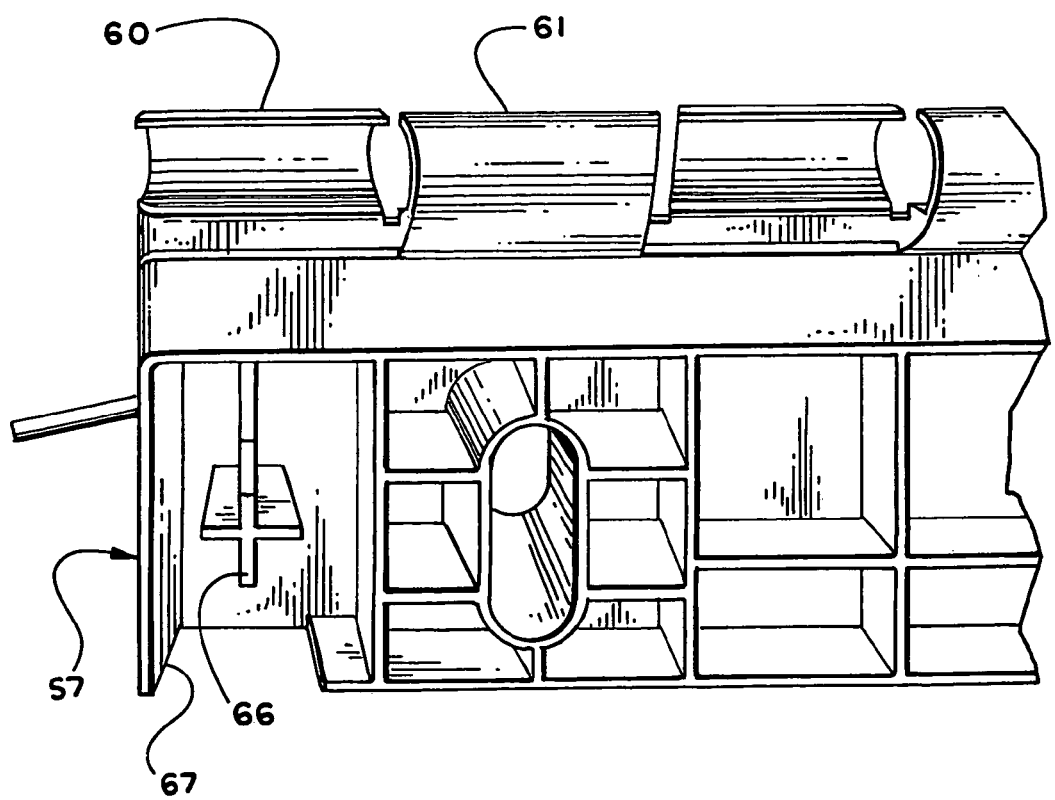
FIG. 18 is a pictorial view of the hinge embodying a plurality of flexible fingers in alternating directions.

A hinge member 55 is mounted or formed along the end of the deck panel 50 that is to be connected to the side wall 14. In a preferred embodiment, the hinge member includes one or more blocks 57 and a plurality of somewhat flexible fingers 60 and 61 spaced along each block 57. A portion of a block 57 is shown in FIG. 18. Preferably, the fingers 60 are arcuate, and may lie along a portion of a circle. The similar fingers 61 curve in the opposite direction to the fingers 60 and may be positioned along the block 57 either even with or alternating with the fingers 60. If directly opposite one another, the length of the respective fingers should be such that they do not interfere with one another when flexing as described below.

The block 57 is sized to be received in a cavity 63 formed in the end of the panel 50. The interior surfaces of the cavity define a space within which mating areas of the block can slide. The block 57 is pulled back against an interior wall or stop of the cavity 63 by a spring 65, or other elastic member, strong enough to hold the block firmly in the cavity during routine operation of the deck system between the stowed and deployed configurations. For example, if a single elongate block 57 is used, two 20-30 pound springs, one near each end of the hinge, would be suitable. Each spring may extend from a post 66 within the block 57, through an opening 67 in the block. The interior wall may have an opening (not shown) through which the spring extends to be secured to a reinforced member 64 within the panel 50 shown in dashed lines in FIG. 14.

Figure 17:
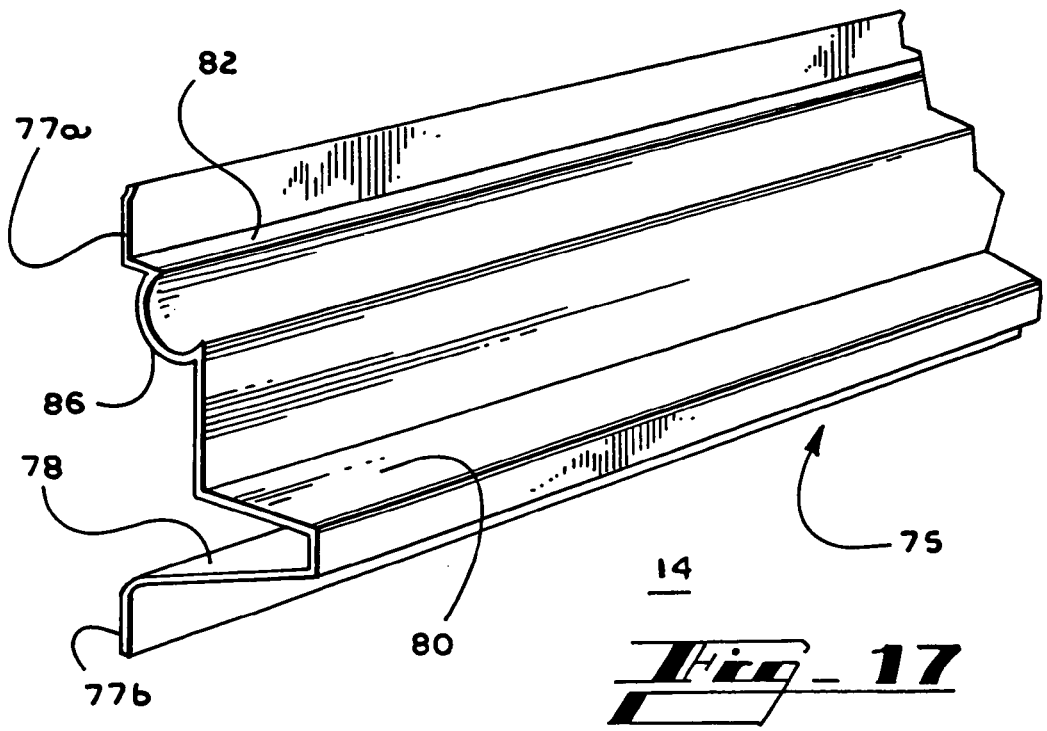
FIG. 17 is a pictorial view of a support member utilized in embodiments of the present invention, mounted on a trailer wall.

The alternative system for pivotally mounting deck panels to the side walls 14 also includes a support member 75 which may be an aluminum extrusion or a formed, molded, or assembled part of any suitable material. The support member 75 as shown in FIGS. 12-16 defines a vertical wall 77 adapted to be secured to the side wall 14 by any suitable means. Another embodiment of the support member 75 is shown mounted on a side wall 14 in FIG. 17. In the embodiment of FIG. 17, the support member 75 has an open back portion and vertical wall portions 77a and 77b which can engage the side wall at upper and lower extremes of the support member. A lower wall 78 angles upwardly to a horizontal ledge 80. From the ledge 80, a vertical wall 84 extends up to a pocket 86. A second ledge 82 is defined at the opposite side of the pocket 86, and extends to the vertical wall 77, or the portion 77a in the case of the embodiment shown in FIG. 17. The width of the ledge 80 preferably is not larger than the thickness of the deck panel 50, as shown in FIG. 14, so that the ledge does not protrude into the compartment any farther than the stowed deck panel. The ledge 80 bears the weight of the deployed deck panel 50 as shown in FIG. 13, and the ledge 82 bears the weight of the deck panel 50 when stowed, as shown in FIG. 14. The ledges prevent the hinge fingers 60 and 61 from bearing such weight.

The pocket 86 is shown as an elongate channel forming part of a circle in cross section. In a preferred embodiment, the partial circle of the pocket extends beyond 180 degrees to lips 88 and 89 of the pocket 86 (marked in FIG. 14), allowing the pocket 86 to trap the arcuate fingers 60 and 61 when they are forced to flex and snap into the pocket 86. Preferably, the deck panel 50 is sufficiently light in weight and the fingers 60 and 61 are of a flexibility selected so that one person can manipulate a deck panel to a position in which the line of fingers aligns with the elongate pocket 86, and can force the fingers to snap into the pocket (or remove the fingers from the pocket for disassembly). It should be understood, however, that the profile of the pocket need not be part of a circle or form a smooth curve. Also, the fingers need not be circular or arcuate, and alternatively each pair of fingers 60 and 61 could be replaced by any compressible member or assembly capable of being forced into and retained movably within the pocket for functioning as a hinge.

Furthermore, it should be understood that two or more separate pockets could be provided spaced along the end of the deck panel 50, with hinge members on the panel at mating locations. In such a case the block could be an elongate structure, or separated blocks could be received in separate cavities in the panel.

The support member 75 is shown in FIGS. 12-16 with internal reinforcing web structures. These may not be needed depending on the weight of items being transported, and are not present in the embodiment shown in FIG. 17. Also, the portion of the vertical wall 77 below the ledge 82 may be omitted.

In another embodiment shown in FIG. 16, a block 57' may be positioned in a cavity formed symmetrically within a deck panel 50'. In this embodiment, the fingers 60 and 61 are mounted asymmetrically to the block, resulting in the deck panel, the fingers 60 and 61, and the support member 75 having the same relative orientation as shown in FIGS. 13 and 14. The purpose for this alternative is to allow the deck panel 50' to be made in two symmetrical "clamshell" halves with half of the cavity 63 in each half of the deck panel.

From the foregoing, assembly and use of a deck panel supported according to the embodiment as shown in FIGS. 12-18 will be apparent to those skilled in the art. The hinge members 55 are placed within the portion of a cavity 63 formed in a half of a deck panel 50 or 50', and a spring is connected between the post 66 and the reinforced member 64. Then the other half of the deck member is engaged to complete the deck member and form the cavity 63 with the flexible fingers 60 and 61 protruding. A support member 75 is attached to a side wall 14 of a compartment, usually in a horizontal orientation. Given a preferred construction of the support member and the deck hinge member, one person can manipulate the flexible fingers into alignment along the pocket or pockets 86 of the support member, and force the fingers to snap into the pocket. The installed configuration is shown in FIGS. 13, 14, and 16. In use, the deck panel now can be rotated about the hinge axis from a stowed configuration shown in FIG. 14 to a deployed configuration shown in FIG. 13. The relative positioning, central support, and locking of a plurality of the deck panels 50 or 50' within a freight compartment can be done according to the systems described above in connection with FIGS. 1-11.

Another embodiment of the hinge member is illustrated in FIG. 19 where the hinge member includes an elongate, arcuate member 90 attached to each block 57 at the same positions as fingers 60, 61 in an earlier embodiment. Preferably, the arcuate member 90 lies along a portion of a circle, defining a gap 96 at an angle from a perpendicular extending from the face of the block 57. At the edges of the gap, inwardly directed flanges are extruded to form a slot. A locking plunger 91 is provided and shaped for sliding movement within the slot 95. An outer surface of the plunger 91 is curved at the same radius as the hinge 90. The hinge member 90 is preferably made from a rigid material, such as extruded aluminum or a plastic-based material.

The locking plunger in FIG. 19 is illustrated as fully mated, that is, fully extended outwards from the center of the circle formed by the rigid circular member 90. In the fully mated position, the assembly of the circular member 90 and the locking plunger 91 form a largely complete circle that is designed to pivot inside the pocket 86 when inserted. The diameter of the largely complete circle when measured along the path of the locking plunger 91 is illustrated as $d_2$. The distance $d_2$ varies based on the position of the plunger 91. The diameter of the largely completed circle not intersecting the gap 96 is illustrated as $d_1$ and does not vary with the position of the plunger 91. When the plunger is fully mated, the diameter of $d_2$ is equal to $d_1$. The locking plunger 91 is held in the mated position by one of a variety of methods. Illustrated in FIG. 19 is a spring 94 positioned between the circular member 90 and the locking plunger 91 so that the springs pushes the locking plunger against the circular member. The spring may be maintained in its position in a conventional manner using nibs 92 present on the locking plunger and on the inside surface of the acuate member. Another embodiment for maintaining the locking plunger 91 in a fully mated position is to use a set screw (not shown) extending into the hinge member from approximately opposite the gap 96, to push the locking plunger against the circular member.

In this embodiment, the locking plunger must be in a partially mated position in order to insert the hinge into the pocket assembly as illustrated in FIG. 20. The pocket 86 forms a semi-circular structure greater than 180 degrees and is bounded by the edges or lips of the pocket 93a, 93b The pocket opening is the distance between the lips 93a, 93b and is less than the inside diameter of the pocket The outside diameter $d_1$ formed by the circular member 90 is slightly smaller than the inside diameter of the pocket 86 but greater than the pocket opening such that insertion or removal of the hinge assembly is not possible when the locking plunger 91 is fully mated or the hinge 90 is oriented with the full diameter $d_1$ facing the opening of the pocket 86. The illustration of FIG. 20 depicts the insertion of the hinge into the pocket with the locking plunger partially mated. In FIG. 20, the insertion of the hinge requires the hinge and deck panel assembly to be at a certain angle so that the diameter $d_2$ of the hinge is presented and allowed to pass though the opening of the pocket As the hinge is inserted into the pocket, the pocket lip 93a pushes against the locking plunger 91 forcing it inward such that $d_2$ is less than $d_1$. The spring 94 is compressible and the locking plunger maintains contact with the pocket lip 93a while it compresses the spring 94. Because insertion or removal requires compression of the spring, a measure of lateral force is required for the hinge to be inserted. After the hinge is fully inserted into the pocket, the spring forces the locking plunger back into the fully mated position such that $d_2$ is equal to $d_1$, allowing the hinge to be rotated. When the deck plunger 57 is rotated to a horizontal position (not shown), the hinge assembly is retained within the pocket because a full diameter $d_1$ is presented to the pocket opening. The diameter $d_1$ is does not vary and is greater than the pocket opening. If a locking set screw is used to position the locking plunger, the screw can be advanced after the hinge is inserted to mate the locking plunger for smooth rotation of the hinge.

Figure 21:
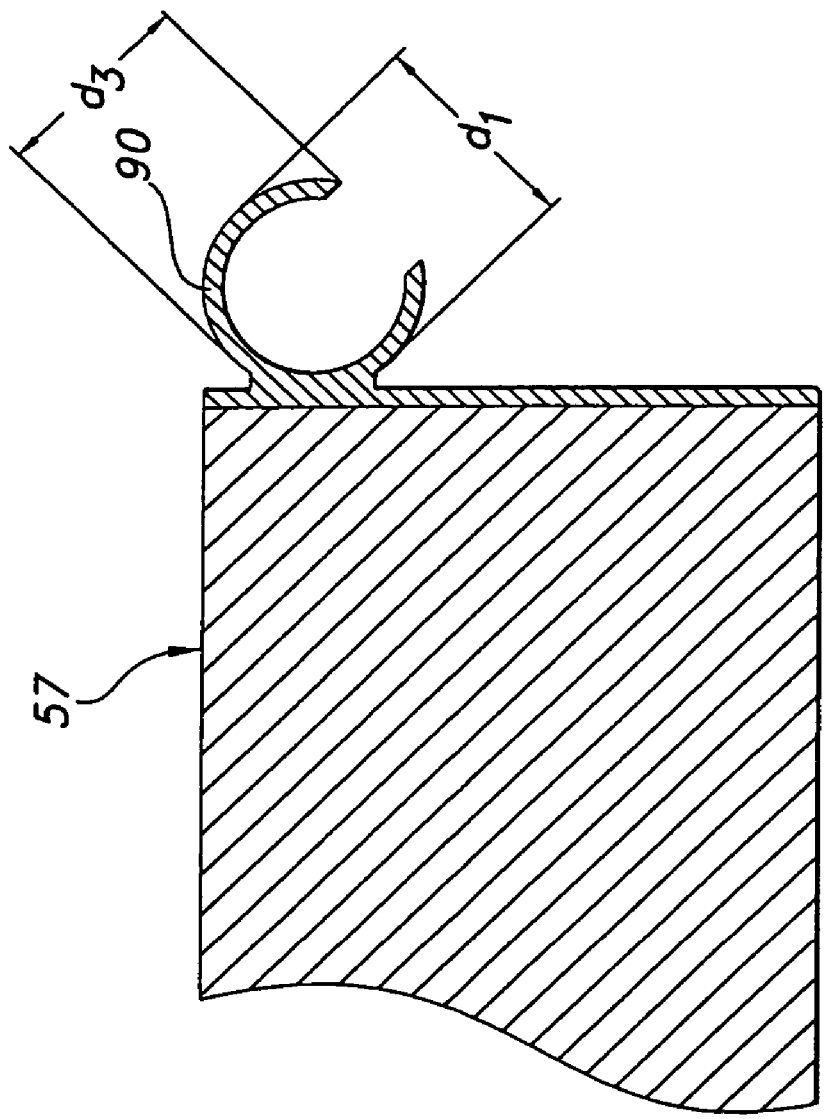
FIG. 21 is a cross sectional view of the hinge embodying a single piece hinge assembly.

In another embodiment of the hinge structure, shown in FIG. 21, the hinge can comprise solely the partial circular rim of the hinge 90 without any locking plunger and spring. This allows insertion and removal of the hinge at a specific angle without any force. The specific angle is obtained when the diameter as defined by $d_3$ is opposite to the opening of the pocket (not shown). Once the hinge is fully inserted and is rotated to a horizontal or vertical position, the diameter of the hinge 90 as defined by $d_1$ is retained within the pocket by the lips 93a, 93b of the pocket. In use of this embodiment, care should be taken not to exert a withdrawing force on the deck panel while it is being rotated between its stowed and deployed positions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

That which is claimed:

1. A hinge structure, comprising:
   a rigid first member comprising a concave receptacle portion, said concave receptacle portion defining an open channel positioned along a pivot axis; and
   a second member defining at least one flexible projection sized and shaped to be snapped into and retained within said concave receptacle portion so as to allow pivotal movement of said first member with respect to said second member about said pivot axis such that the at least one flexible projection is retained within said concave receptacle portion along the entire range of pivotal movement of said first member with respect to said second member.

2. The hinge structure of claim 1 wherein the flexible projection comprises a semi-circular shaped cross section.

3. The hinge structure of claim 1 wherein said flexible projection comprises a plurality of arcuate fingers.

4. The hinge structure of claim 3 where said arcuate fingers comprise at least one arcuate finger having a direction of curvature opposite from a direction of curvature of at least one other arcuate finger.

5. The hinge structure of claim 1, wherein said concave receptacle portion traps said flexible projection when said flexible projection is forced to flex and snap into said concave receptacle portion.

6. The hinge structure of claim 1, wherein said flexible projection is of a flexibility selected to allow the flexible projection to be snapped into and pulled out of said concave receptacle portion.

7. The hinge structure of claim 1, wherein said flexible projection comprises an arcuate finger.

8. The hinge structure of claim 1, wherein said second member comprises a plurality of said flexible projections connected to a base.

9. The hinge structure of claim 1 wherein said concave receptacle portion defines an opening that is parallel to said pivot axis.

10. The hinge structure of claim 9 wherein said flexible projection is sized and shaped to be inserted through said opening of said concave receptacle portion so as to allow pivotal movement of said first member about said pivot axis such that said at least one flexible projection is retained within said concave receptacle along the entire range of pivotal movement of said first member with respect to said second member.

11. The hinge structure of claim 1 wherein a cross-section of said concave receptacle portion is c-shaped.

12. A hinge structure comprising:
   a rigid first member comprising a concave receptacle portion, said concave receptacle portion defining an open channel positioned along a pivot axis; and
   a second member defining at least one flexible projection sized and shaped to be snapped into and retained within said concave receptacle portion so as to allow pivotal movement of said first member with respect to said second member about said pivot axis such that the at least one flexible projection is retained within said concave receptacle portion along the entire range of pivotal movement of said first member with respect to said second member, wherein said second member comprises a plurality of said flexible projections connected to a base and said flexible projections comprise arcuate fingers that are attached at one end to said base.

13. A hinge structure comprising:

a rigid first member comprising a concave receptacle portion, said concave receptacle portion defining an open channel positioned along a pivot axis; and a second member defining at least one flexible projection sized and shaped to be snapped into and retained within said concave receptacle portion so as to allow pivotal movement of said first member with respect to said second member about said pivot axis such that the at least one flexible projection is retained within said concave receptacle portion along the entire range of pivotal movement of said first member with respect to said second member, and said second member comprises a plurality of said flexible projections connected to a base, wherein said flexible projections comprise arcuate fingers that are attached at one end to said base, and wherein said arcuate fingers attached to said base comprise at least one arcuate finger having a direction of curvature opposite from a direction of curvature of at least one other arcuate finger.

14. A hinge structure comprising:

a first member defining one or more pockets therein, said one or more pockets each defining an elongate channel positioned along a first pivot axis, wherein said elongate channel has a part-circular cross section that extends beyond 180 degrees; and a second member defining at least one rigid projection having a portion of a cross section corresponding to a semi-circular shape that is sized so as to be insertable into said pocket without deforming said pocket of said first member when positioned at a first relative angle to the first member, said projection retained within said pocket when pivoted along the pivot axis to a second relative angle to the first member wherein the second member comprises a locking plunger disposed relative to said rigid projection, said locking plunger having a cross section of a second semi-circular shape and positioned so as to result in the second member snapping into the first member when inserted into said pocket.

15. A hinge structure comprising:

a first member defining one or more pockets therein, said one or more pockets each defining an elongate channel positioned along a first pivot axis, wherein said elongate channel has a part-circular cross section that extends beyond 180 degrees; and a second member defining at least one rigid projection having a portion of a cross section corresponding to a semi-circular shape that is sized so as to be insertable into said pocket without deforming said pocket of said first member when positioned at a first relative angle to the first member, said projection retained within said pocket when pivoted along the pivot axis to a second relative angle to the first member wherein the second member comprises a locking plunger disposed relative to said rigid projection, said locking plunger having a cross section of a second semi-circular shape and positioned so as to result in the second member snapping into the first member when inserted into said pocket;

wherein said locking plunger mates with the rigid projection by use of a spring.

16. A hinge structure, comprising:

a first member comprising a concave receptacle portion, said concave receptacle portion defining an open channel positioned along a pivot axis, wherein said open channel has a part-circular cross section that extends beyond 180 degrees; and a second member defining a uniform projection sized and shaped to be inserted into and retained within said concave receptacle portion so as to allow pivotal movement of said first member with respect to said second member about said pivot axis such that the projection is retained within said concave receptacle portion along the entire range of pivotal movement of said first member with respect to said second member, wherein the uniform projection is flexible so that said projection snaps into said concave receptacle portion of said first member when inserted.

17. The hinge structure of claim 16 wherein the uniform projection is made of plastic.

18. A hinge structure, comprising:

a first member comprising a concave receptacle portion, said concave receptacle portion defining an open channel positioned along a pivot axis, wherein said open channel has a part-circular cross section that extends beyond 180 degrees; and a second member defining a uniform projection sized and shaped to be inserted into and retained within said concave receptacle portion so as to allow pivotal movement of said first member with respect to said second member about said pivot axis such that the projection is retained within said concave receptacle portion along the entire range of pivotal movement of said first member with respect to said second member, wherein the uniform projection snaps into the concave receptacle portion when inserted.

* * * * *